(12) United States Patent
Ota et al.

(10) Patent No.: US 12,000,454 B2
(45) Date of Patent: Jun. 4, 2024

(54) FLEXIBLE FLYWHEEL

(71) Applicant: AISIN TAKAOKA CO., LTD., Toyota (JP)

(72) Inventors: Tsuyoshi Ota, Toyota (JP); Akira Sato, Toyota (JP)

(73) Assignee: AISIN TAKAOKA CO., LTD., Toyota (JP)

(*) Notice: Subject to any disclaimer, the term of this patent is extended or adjusted under 35 U.S.C. 154(b) by 77 days.

(21) Appl. No.: 17/795,976

(22) PCT Filed: Feb. 5, 2021

(86) PCT No.: PCT/JP2021/004320
§ 371 (c)(1),
(2) Date: Jul. 28, 2022

(87) PCT Pub. No.: WO2021/166685
PCT Pub. Date: Aug. 26, 2021

(65) Prior Publication Data
US 2023/0093442 A1    Mar. 23, 2023

(30) Foreign Application Priority Data
Feb. 19, 2020 (JP) ................... 2020-026512

(51) Int. Cl.
*F16F 15/30* (2006.01)

(52) U.S. Cl.
CPC .......... *F16F 15/30* (2013.01); *F16F 2222/08* (2013.01); *F16F 2230/24* (2013.01);
(Continued)

(58) Field of Classification Search
CPC .... F16F 15/30; F16F 2222/08; F16F 2230/24; F16F 2230/36; F16F 2232/02; F16F 2236/08; F16F 2226/047
See application file for complete search history.

(56) References Cited

U.S. PATENT DOCUMENTS

2009/0120401 A1* 5/2009 Dopke ................. F16F 15/315
123/192.1
2019/0186611 A1 6/2019 Kinoshita et al.
(Continued)

FOREIGN PATENT DOCUMENTS

CN 205559683 U 9/2016
CN 109690275 A 4/2019
(Continued)

OTHER PUBLICATIONS

Machine translation of FR 2849683A1, Verhoog, Jul. 9, 2004 (Year: 2004).*
(Continued)

*Primary Examiner* — Vinh Luong
(74) *Attorney, Agent, or Firm* — BUCHANAN INGERSOLL & ROONEY PC (57) ABSTRACT

A flexible flywheel includes: a shaft fastening portion fixed to an end portion of an engine crankshaft; an annular inertia ring provided around the shaft fastening portion; a plurality of elastic spoke portions that extend in the radial direction between the shaft fastening portion and the inertia ring and connect the shaft fastening portion and the inertia ring to each other, and that absorb vibration acting on the crankshaft by undergoing deflection; and weight portions provided between adjacent elastic spoke portions, side edge-side boundary ends, to which boundaries with the weight portions are connected, are provided on both sides edges of the (Continued)

elastic spoke portion, respectively, when the elastic spoke portions are vibrated, stress concentrates on the side edge-side boundary ends.

11 Claims, 8 Drawing Sheets

(52) U.S. Cl.
CPC ....... *F16F 2230/36* (2013.01); *F16F 2232/02* (2013.01); *F16F 2236/08* (2013.01)

(56) References Cited

U.S. PATENT DOCUMENTS

| | | | |
|---|---|---|---|
| 2019/0257387 A1 | 8/2019 | Rogalla et al. | |
| 2022/0010859 A1* | 1/2022 | Ota | F16F 15/3153 |
| 2023/0358294 A1* | 11/2023 | Rusch | F16F 15/145 |

FOREIGN PATENT DOCUMENTS

| | | | | |
|---|---|---|---|---|
| CN | 110005754 A | | 7/2019 | |
| DE | 35 29 687 A1 | | 3/1987 | |
| DE | 102011017397 A1 | | 11/2011 | |
| FR | 2849683 A1 | * | 7/2004 | ............. F16F 15/14 |
| FR | 2895471 A1 | * | 6/2007 | ........ F16F 15/13107 |
| JP | S4853200 A | | 7/1973 | |
| JP | S54-109584 A | | 8/1979 | |
| JP | H11182631 A | | 7/1999 | |
| JP | 2000120792 A | | 4/2000 | |
| JP | 2003-014050 A | | 1/2003 | |
| JP | 2006242254 A | | 9/2006 | |
| JP | 2008527231 A | * | 7/2008 | .......... F16F 15/3153 |
| JP | 2016156417 A | | 9/2016 | |
| JP | 2016169851 A | | 9/2016 | |
| JP | 2019108942 A | * | 7/2019 | ............ F16F 15/126 |

OTHER PUBLICATIONS

Machine translation of FR 2895471A1, Cassu et al., Jun. 29, 2007 (Year: 2007).*
Machine translation of JP 2008527231A, Jul. 24, 2008 (Year: 2008).*
Translation of JP-2019108942-A, Ito et al., Jul. 4, 2019 (Year: 2019).*
Office Action (The First Office Action) dated Apr. 17, 2023, by the National Intellectual Property Administration, P. R. China in corresponding Chinese Patent Application No. 202180010850.8 and an English translation of the Office Action. (16 pages).
Office Action dated Sep. 28, 2023, by the German it Patent and Trademark Office in corresponding German Patent Application No. 11 2021 000 315.1 and an English translation of the Office Action. (14 pages).
Office Action (Second Office Action) dated Nov. 1, 2023, by the National Intellectual Property Administration, P. R. China in corresponding Chinese Patent Application No. 202180010850.8 and an English translation of the Office Action. (9 pages).
Notification Concerning Transmittal of the International Preliminary Report on Patentability, Notification of Transmittal of Translation of the International Preliminary Report on Patentability (Forms PCT/IB/326, PCT/IB/338 and PCT/IB/373) and the Written Opinion of the International Searching Authority (Form PCT/ISA/237) dated Sep. 1, 2022, by the International Bureau of WIPO in corresponding International Application No. PCT/JP2021/004320. (11 pages).
International Search Report (PCT/ISA/210) with translation and Written Opinion (PCT/ISA/237) dated Mar. 30, 2021, by the Japanese Patent Office as the International Searching Authority for International Application No. PCT/JP2021/004320. (10 pages).

* cited by examiner

FLEXIBLE FLYWHEEL

CROSS REFERENCE TO RELATED APPLICATION

The present application is based on Japanese Patent Application No. 2020-26512 filed on Feb. 19, 2020, and the entire contents described therein is incorporated by reference in this specification.

TECHNICAL FIELD

The present disclosure relates to a flexible flywheel.

BACKGROUND ART

In general, in a rotating machine such as an internal combustion engine of a vehicle, a flywheel is attached to one end of a crankshaft. The flywheel has an annular inertia ring, thereby having a relatively large moment of inertia. By virtue of the moment of inertia, rotational energy produced as a result of rotational motion of the crankshaft is stored. Since the flywheel is attached to the crankshaft, stable rotational motion of the crankshaft is attained.

A flexible flywheel, which is one type of flywheel, has been known. The flexible flywheel has a function of absorbing vibrations acting on the crankshaft in addition to the above-described function of storing rotational energy by virtue of moment of inertia. In order to attain such a function, the flexible flywheel has an elastic disk. The elastic disk is fixed to the crankshaft, and absorbs and reduces vibrations through elastic deformation. The inertia ring is provided at a circumferential edge portion of the elastic disk. The elastic disk and the inertia ring are fastened together by, for example, bolts, thereby being integrated (see, for example, Patent Literature 1).

CITATION LIST

Patent Literature

Patent Literature 1: Japanese Patent Application Laid-Open (kokai) No. 11-182631

SUMMARY OF THE INVENTION

Problems to be Solved by the Invention

In order to improve the vibration attenuation characteristics of the conventional flexible flywheel, it may be conceivable to reduce rigidity of the elastic disc. For example, by providing a punched portion, and furthermore reducing the thickness to 4 mm or less, the rigidity can be reduced and in turn the vibration attenuation characteristics can be improved.

On the other hand, reducing the rigidity of the elastic disc may render the elastic disc relatively prone to breakage. If the elastic disc is broken, scattering of fragments would result in a problem of breakage of components around the flywheel.

In view of the above-described circumstances, an objective of the present disclosure is to provide a flexible flywheel that is capable of improving the vibration attenuation characteristics through reduction of rigidity of an elastic disc, and in a case of breakage of the elastic disc, controlling the breakage.

Means for Solving the Problems

In order to accomplish the above-described object, a flexible flywheel of a first disclosure includes a shaft fastening portion, an annular inertia ring, a plurality of elastic spoke portions, a weight portion. The shaft fastening portion is configured to fix to an end portion of a shaft of a rotating machine. The annular inertia ring is provided around the shaft fastening portion. The plurality of elastic spoke portions extend in the radial direction between the shaft fastening portion and the inertia ring and connect the shaft fastening portion and the inertia ring to each other. The elastic spoke portions absorb a vibration acting on the shaft by undergoing deflection. The weight portion provided between adjacent ones of the elastic spoke portions. The weight portion is connected to one of the shaft fastening portion and the inertia ring and being spaced from the other of the shaft fastening portion and the inertia ring. The elastic spoke portion is provided on each of both side edges of the elastic spoke portion viewed in the circumferential direction of the shaft fastening portion. In this flexible flywheel, a stress concentration portion on which stress is concentrated during vibration of the elastic spoke portion is provided on each of both side edges of the elastic spoke portion viewed in a circumferential direction of the shaft fastening portion.

In the flexible flywheel according to a second disclosure, the stress concentration portions are provided on the same circle around the center point of the shaft fastening portion.

In the flexible flywheel according to a third disclosure, a length of an arc connecting the stress concentration portions is shortest among concentric arcs connecting the both side edges of the elastic spoke portion around the center point of the shaft fastening portion.

In the flexible flywheel according to a fourth disclosure, the weight portion is thicker than the elastic spoke portion, and formed to protrude from one face of the elastic spoke portion. In a protrusion start portion where the weight portion protrudes from the one face of the elastic spoke portion, a boundary between the weight portion and the elastic spoke portion extends from the shaft fastening portion toward the inertia ring. The boundary extends to be connected to the side edge of the elastic spoke portion, and a side edge-side boundary end connected to the side edge serves as the stress concentration portion.

In the flexible flywheel according to a fifth disclosure, the side edge of the elastic spoke portion and a side edge of the weight portion adjacent to the side edge of the elastic spoke portion are connected by an arc-like portion. The arc-like portion includes a first arc-like portion provided on the weight portion side and a second arc-like portion provided on the elastic spoke portion side and having a smaller curvature radius than the first arc-like portion. The stress concentration portion comprises the second arc-like portion.

In the flexible flywheel according to a sixth disclosure, a groove portion connecting the both side edges of the elastic spoke portion is formed on the elastic spoke portion. The groove portion includes open end portions that are open outward from the respective side edges of the elastic spoke portion. The stress concentration portion is provided in each of the open-end portions of the groove portion.

Effects of the Invention

According to the first disclosure, stress generated upon deflection of the elastic spoke portion due to vibration of the crankshaft is concentrated on the stress concentration portion. In a case in which the elastic spoke portion cannot resist the vibration and is broken, the stress concentration portion serves as a point of origin of the breakage, and a crack runs between the stress concentration portions on the both side edges, leading to a rupture. Even if the elastic spoke portion is broken, due to the breakage mode being thus controlled in advance, fragments generated by the breakage can be prevented from scattering around and breaking components around the flexible flywheel.

According to the second disclosure, the stress concentration portions on the both side edges of the elastic spoke portion are provided on the same circle. Even if the elastic spoke portion is broken, an arc-like crack and an arc-like rupture are more likely to be generated between the both stress concentration portions along a rotational moment acting on the elastic spoke portion, whereby control of the breakage mode is also facilitated. If the stress concentration portions are not on the same circle and provided in positions at different distances from the center, a crack and a rupture extend in undesired directions. When a crack and a rupture extend in undesired directions, prediction of the breakage mode becomes difficult, and unpredictable breakage may be caused leading to greater likelihood of scattering of fragments. The second disclosure can reduce such a risk.

According to the third disclosure, the virtual arc connecting the stress concentration portions is short, whereby a risk of generation of a crack and a rupture in undesired directions such as a direction out of the arc is further reduced. As a result, the risk of unpredictable breakage leading to greater likelihood of scattering of fragments can be further reduced.

According to the fourth disclosure, the stress concentration portion can be easily provided by leveraging a difference in thickness between the elastic spoke portion and the weight portion. In addition, since the side edge-side boundary end where the boundary between the weight portion and the elastic spoke portion is connected to the side edge of the elastic spoke portion is a portion on which the stress generated by vibration of the elastic spoke portion is likely to be concentrated, the side edge-side boundary end serving as the stress concentration portion facilitates control of the breakage mode.

According to the fifth disclosure, even in the flexible flywheel in which the weight portion and the elastic spoke portion are configured to have substantially the same thickness, the stress concentration portion can be formed. In addition, due to the second arc-like portion having the smaller curvature radius, among the two arc-like portions having different curvature radii, serving as the stress concentration portion, a degree of stress concentration is lowered compared to the case of an acute angle corner portion serving as the stress concentration portion, whereby occurrence of undue stress concentration can be suppressed.

According to the sixth disclosure, if the elastic spoke portion is broken, an arc-like crack and an arc-like rupture are more likely to be generated along the groove portion, whereby control of the breakage mode is facilitated. In addition, even in the flexible flywheel in which the weight portion and the elastic spoke portion are configured to have substantially the same thickness, the stress concentration portion can be formed.

BRIEF DESCRIPTION OF THE DRAWINGS

The objects described above and other objects, features, and advantages of the present disclosure will be apparent from the following detailed description with reference to the accompanying drawings.

DESCRIPTION OF EMBODIMENTS

Hereafter, one embodiment of carrying out the present disclosure is described with reference to the drawings. In the present embodiment, an internal combustion engine (engine) of a vehicle is assumed to be a rotating machine, and a flexible flywheel which is attached to a crankshaft of the engine will be described.

Figure 1:
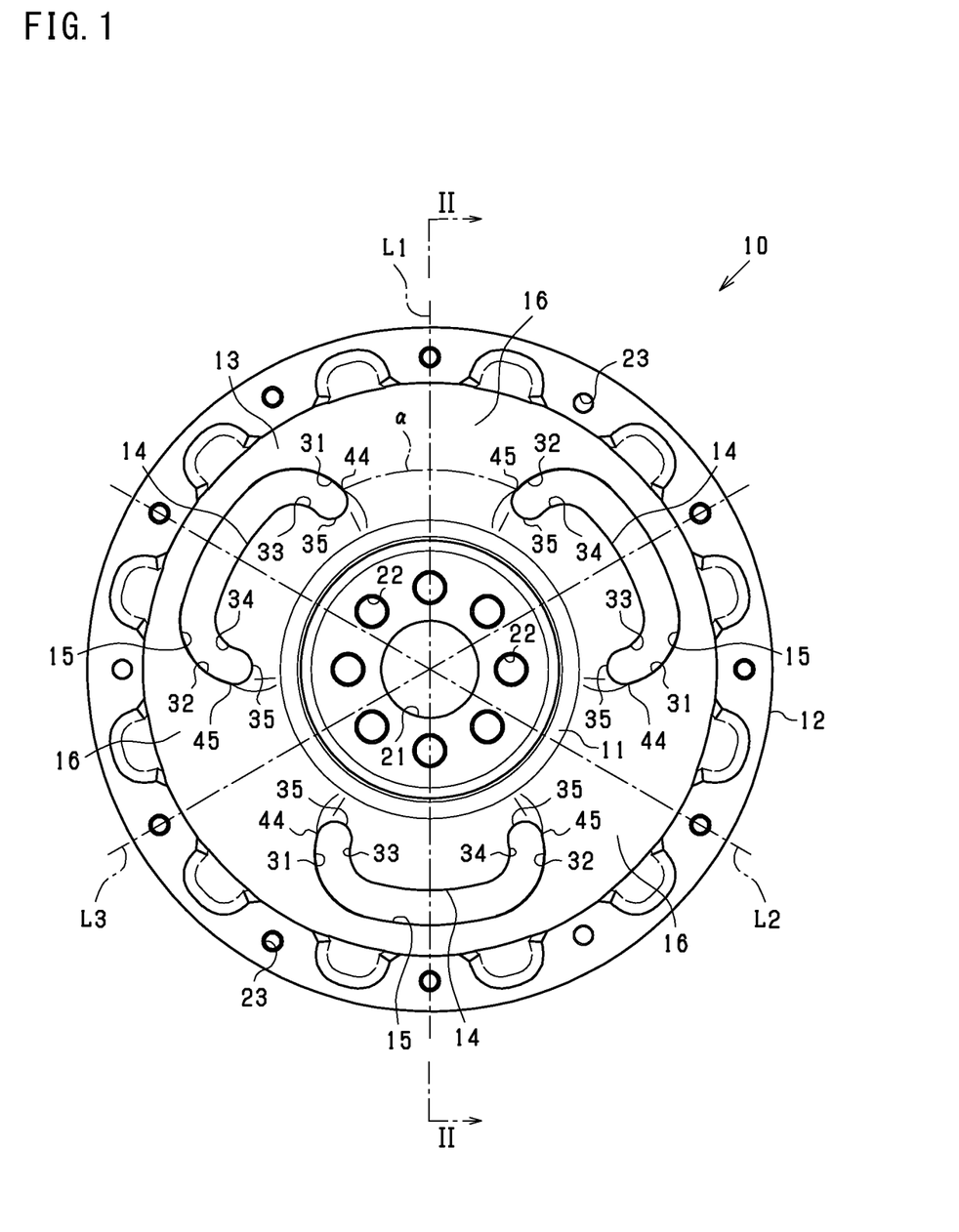
FIG. 1 is a front view of a flexible flywheel.

As shown in FIG. 1, the flexible flywheel 10 has a circular shape as a whole. The flexible flywheel 10 has a shaft fastening portion 11, an inertia ring 12, an elastic disc 13, and weight portions 14. The shaft fastening portion 11, the inertia ring 12, the elastic disc 13 and the weight portions 14 are integrally formed, as a cast product, by casting cast iron or the like.

The shaft fastening portion 11 is fastened to a front end portion of a crankshaft (not illustrated). The shaft fastening portion 11 is formed into the shape of a circular plate and is provided at the center of the flexible flywheel 10. When the shaft fastening portion 11 is attached to the crankshaft, the shaft fastening portion 11 comes into contact with an end surface (not illustrated) for fastening of the crankshaft. A positioning hole 21 is provided at the center of the shaft fastening portion 11. The flexible flywheel 10 is positioned by using the positioning hole 21 so that the rotational center axis of the crankshaft and the rotational center axis of the flexible flywheel 10 coincide with each other. A plurality of bolt insertion holes 22 are annularly provided around the positioning hole 21. The shaft fastening portion 11 is fixed to the crankshaft by using the bolt insertion holes 22.

As shown in FIG. 1, the inertia ring 12 is formed into an annular shape. When the flexible flywheel 10 rotates, the inertia ring 12 serves as an inertia mass, and a relatively large moment of inertia is attained due to its weight. Screw holes 23 are formed in the inertia ring 12. A damper (not illustrated) is attached by using the screw holes 23. Note that the damper is provided arbitrary.

The elastic disc 13 is in an annular shape, and links the inertia ring 12 and the shaft fastening portion 11 together over an entire area there between in the circumferential direction. The elastic disc 13 are formed to be thinner than the shaft fastening portion 11. By virtue of deflection of the elastic disc 13, a vibration attenuation effect is attained, and the flywheel is made flexible. Although the thickness of the elastic disc 13 is arbitrarily determined, the thickness is set to, for example, 2 mm to 5 mm, to attain a vibration attenuation effect. As compared with a plate portion of a flywheel not intended to attain such a vibration attenuation effect, the planar stiffness of the elastic disc 13 is reduced, whereby the elastic disc 13 become more likely to deflect.

The elastic disc 13 is provided with three punched portions 15. Each punched portion 15 passes through the elastic disc 13 from top to bottom. Each punched portion 15 is formed in a slightly vertically elongated C-shape in a front view of the elastic disc 13. Each punched portion 15 is provided in a position slightly away from an inner edge of the inertia ring 12, to extend along the circumferential direction. Each punched portion 15 is arranged at regular intervals (every 120° in the present embodiment) in the circumferential direction of the flexible flywheel 10. Each punched portion 15 is arranged such that the opening of the C-shape is directed to the shaft fastening portion 11.

The weight portion 14 is formed on an inner side (on the shaft fastening portion 11 side) with respect to the punched portion 15. Each weight portion 14 is linked to the shaft fastening portion 11. On the opposite side of the weight portion 14 across the shaft fastening portion 11, the punched portion 15 is not provided, and the shaft fastening portion 11 and the inertia ring 12 are linked together by the elastic disc 13. This linked portion is deflected to provide an effect of attenuating vibration. Consequently, the linked portion is particularly referred to as an elastic spoke portion 16 hereinafter. The elastic spoke portion 16 is formed between the adjacent weight portion 14 and the adjacent punched portion 15, and extends in the radial direction to link the shaft fastening portion 11 and the inertia ring 12 together.

The elastic spoke portion 16 includes both side edges 31, 32 in the circumferential direction. Each of the side edges 31, 32 is formed of an outer contour among contours constituting the punched portion 15. The side edges 31, 32 and side edges 33, 34 of the weight portions 14 respectively adjacent to the side edges 31, 32 are respectively connected by arc-like portions 35 in semicircular shapes. A diameter of the semicircular shape constituting the arc-like portion 35 is configured to be substantially the same as the width of the punched portion 15. In the plan view of FIG. 1, an apex part of the arc-like portion 35 does not reach the shaft fastening portion 11, and is on a closer side (outer peripheral side) of the shaft fastening portion 11.

In the front view of FIG. 1, virtual lines L1 to L3 passing through the center of the width in the circumferential direction of each elastic spoke portion 16 and the center of the flexible flywheel 10 are supposed. In this case, an angle between the first virtual line L1 and the second virtual line L2, an angle between the second virtual line L2 and the third virtual line L3, and an angle between the second virtual line L2 and the third virtual line L3 are each configured to be 120°. On each of the virtual lines L1 to L3, the weight portion 14 and the elastic spoke portion 16 are provided on both sides across the shaft fastening portion 11. The weight portion 14 and the elastic spoke portion 16 are line symmetric with respect to each of the virtual lines L1 to L3.

Figure 2:
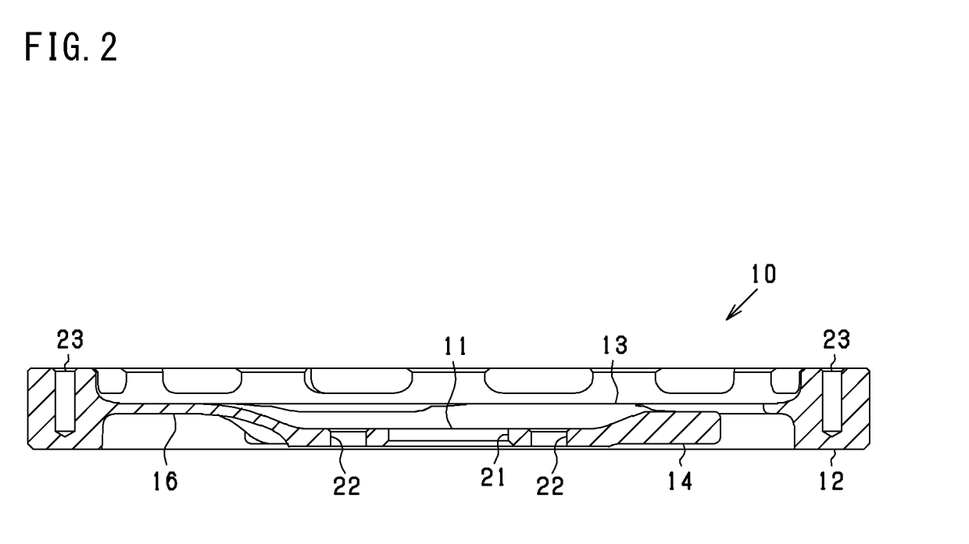
FIG. 2 is a II-II cross section view in FIG. 1.
Figure 3:
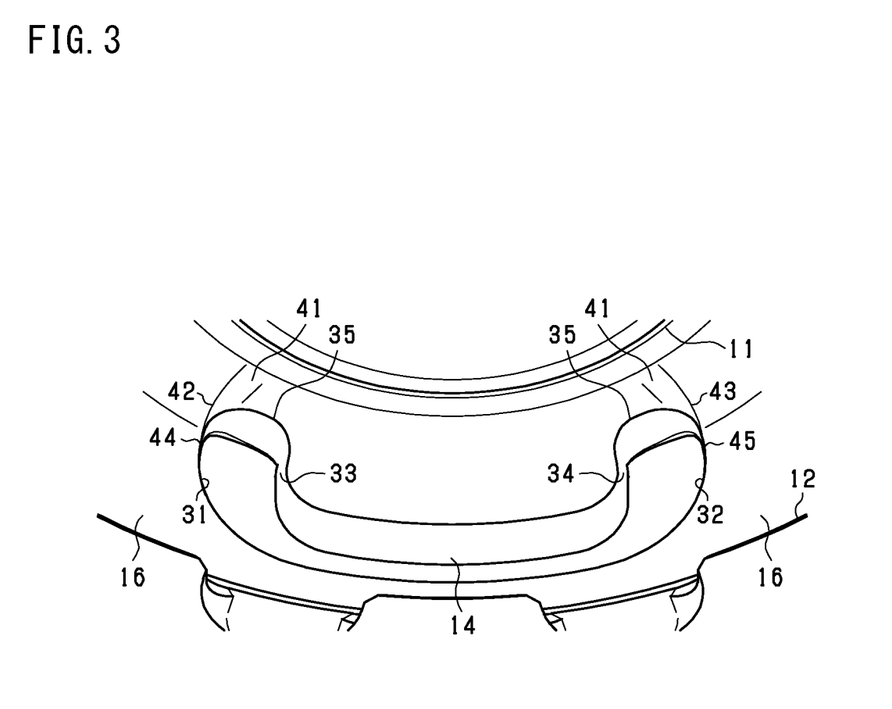
FIG. 3 is an enlarged perspective view of a part of FIG. 1.

As shown in FIG. 2 and FIG. 3, each weight portion 14 is formed to be thicker than the elastic disc 13. For example, each weight portion 14 is configured to be 5 mm to 15 mm in thickness. Each weight portion 14 protrudes from an upper face (one face) of the elastic spoke portion 16, with a difference in thickness between the elastic disc 13 (elastic spoke portion 16) and each weight portion 14. Note that the weight portion 14 may protrude from the reverse face. Each weight portion 14 has a flat upper face, and an arc-like sloped portion 41 provided at each end in the circumferential direction. The arc-like sloped portion 41 is provided on the shaft fastening portion 11 side (center side) with respect to the arc-like portion 35 provided between the elastic spoke portion 16 and the weight portion 14.

An upper face of each arc-like sloped portion 41 is sloped from the upper face of the weight portion 14 toward the upper face of the elastic spoke portion 16, to form an arc. Note that the term "upper face" refers to a surface of the flexible flywheel 10 in a front view as in FIG. 1. As shown in FIG. 3, boundaries (borderlines) 42, 43 are formed where the upper faces of arc-like sloped portions 41 and the upper faces of the elastic spoke portions 16 meet, respectively. The boundaries 42, 43 are curved to protrude toward lateral sides in the circumferential direction in the front view of the flexible flywheel 10, and extend from the shaft fastening portion 11 to the side edges 31, 32 of the elastic spoke portion 16 and are connected to the side edges 31, 32, respectively. When the elastic spoke portion 16 is deflected, the stress thus generated is concentrated on side edge-side boundary ends 44, 45 which are ends of the boundaries 42, 43 on the side edges 31, 32 of the elastic spoke portion 16. Therefore, the side edge-side boundary ends 44, 45 correspond to the stress concentration portion. Note that, when the protrusion of the weight portion 14 is on the reverse face, the side edge-side boundary ends 44, 45 are also provided on the reverse face.

With reference to FIG. 1 again, the side edge-side boundary ends 44, 45 of the boundaries 42, 43 of the both side edges 31, 32 of the elastic spoke portion 16 are provided on the same circle around the center point of the shaft fastening portion 11. A length of a virtual arc a connecting one side edge-side boundary end 44 and the other side edge-side boundary end 45 is the smallest compared to other virtual concentric arcs around the center point of the shaft fastening portion 11 connecting the both side edges 31, 32 in the circumferential direction of the elastic spoke portion 16.

In the flexible flywheel 10 having the above-described structure, when the crankshaft rotates, a moment of inertia is produced by the inertia ring 12. As a result, stable rotational motion of the crankshaft is attained. When the crankshaft vibrates due to drive of the engine, that vibration is transmitted to the shaft fastening portion 11 of the flexible flywheel 10. When the vibration is further transmitted to the elastic spoke portions 16, the elastic spoke portions 16 elastically deform, and absorb and attenuate the vibration. As a result, the crankshaft is prevented from vibrating and can rotate stably.

In addition, the weight portion 14 is provided on the opposite side of the elastic spoke portion 16 across the shaft fastening portion 11. When the crankshaft vibrates, due to the vibration, the weight portions 14 are shaken. Therefore, the vibration of the crankshaft can be absorbed also by shaking of the weight portions 14. As a result, the vibration of the crankshaft can be absorbed and attenuated, on both sides in radial direction of the crankshaft, by the elastic spoke portion 16 and the weight portion 14.

Figure 4:
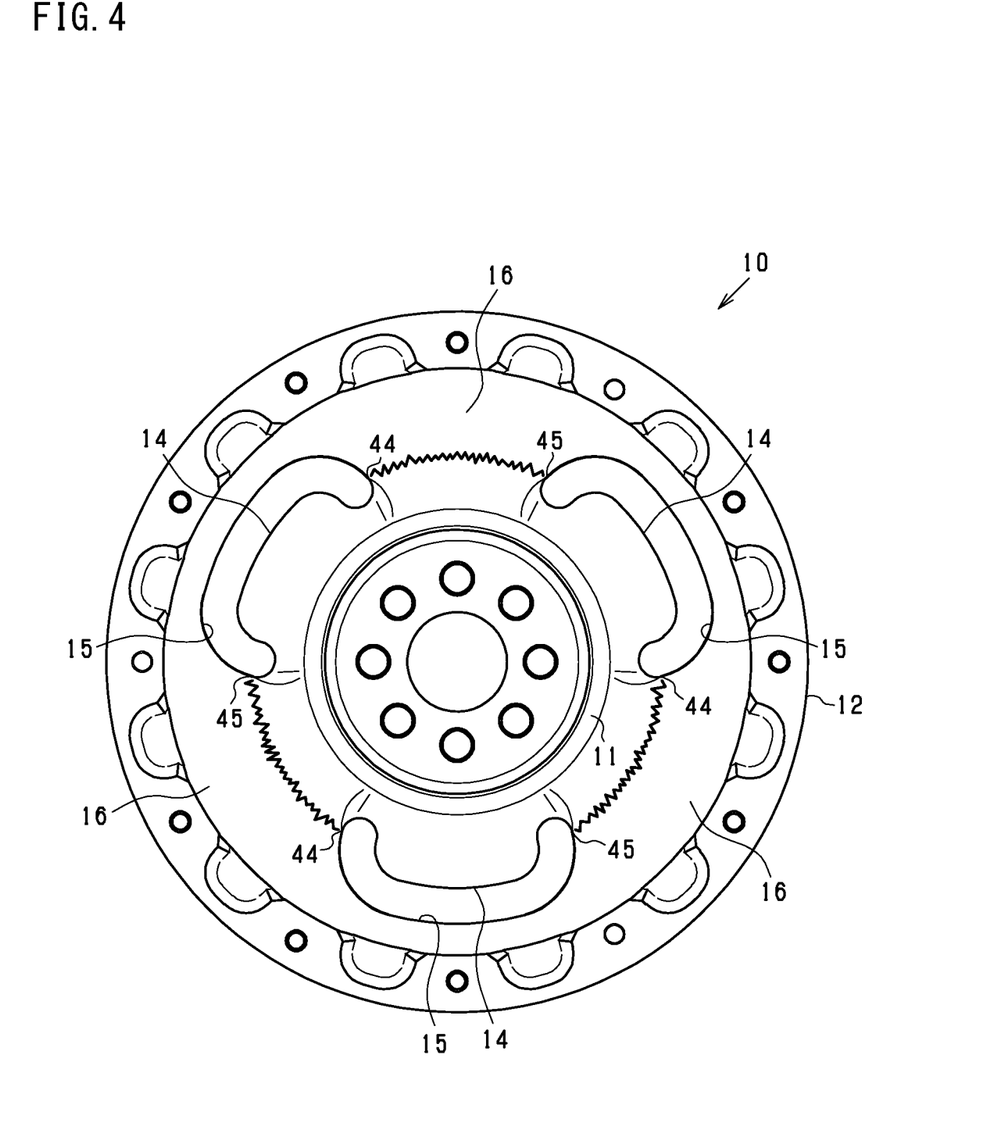
FIG. 4 is a front view showing a broken state of the flexible flywheel.

Here, the rigidity of the elastic spoke portions 16 are great enough to resist excessive vibration of the crankshaft. If vibration exceeding the expectation is generated in the crankshaft, the elastic spoke portions 16 may not be able to resist the vibration and may be broken. The stress generated upon deflection of the elastic spoke portions 16 due to the vibration is concentrated on the side edge-side boundary ends 44, 45 which are ends of the boundaries 42, 43 between the weight portion 14 and the elastic spoke portion 16 on the side edges 31, 32 of the elastic spoke portion 16. Consequently, when the elastic spoke portion 16 is broken, the side edge-side boundary ends 44, 45 serve as points of origin of the breakage, whereby the breakage occurs with a crack running between the side edge-side boundary ends 44, 45 to form an arc as shown in FIG. 4. Even if the elastic spoke portion 16 is broken, the breakage mode is thus controlled in advance so that a crack is formed between the side edge-side boundary ends 44, 45. As a result, fragments generated by the breakage can be prevented from scattering around and breaking components around the flexible flywheel 10.

The flexible flywheel 10 according to the present embodiment is capable of producing the following effects.

(1) The elastic spoke portions 16 are formed to be thin and are formed to have a reduced planar stiffness so that the elastic spoke portions 16 easily deflect. When a vibration occurs in the crankshaft, that vibration is absorbed by deflection of the elastic spoke portions 16. As a result, the vibration of the crankshaft can be attenuated. In the conventional flexible flywheel, the elastic disk is a component different from the inertia ring, and these members are fastened together. In contrast, the elastic spoke portions 16 are integrally formed by casting together with the shaft fastening portion 11 and the inertia ring 12. Therefore, the flexible flywheel 10 is composed of a single component, and a fastening operation of uniting a plurality of components is unnecessary. Thus, it is possible to reduce production cost while maintaining the vibration attenuation function.

(2) On the both side edges 31, 32 of the elastic spoke portion 16, one ends of the boundaries 42, 43 formed by a difference in thickness between the weight portion 14 and the elastic spoke portion 16, i.e., the side edge-side boundary ends 44, 45, are provided. The stress generated upon deflection of the elastic spoke portion 16 due to vibration of the crankshaft is concentrated on the side edge-side boundary ends 44, 45. Consequently, in a case in which the elastic spoke portion 16 cannot resist the vibration and is broken, the side edge-side boundary ends 44, 45 serve as points of origin of the breakage, and a crack runs between the side edge-side boundary ends 44, 45, leading to a rupture. Even if the elastic spoke portion 16 is broken, due to the breakage mode being thus controlled in advance, fragments generated by the breakage can be prevented from scattering around and breaking components around the flexible flywheel 10.

(3) On the both side edges 31, 32 of the elastic spoke portion 16, the side edge-side boundary ends 44, 45 of the boundaries 42, 43 between the weight portions 14 and the elastic spoke portion 16 are provided on the same circle around the center point of the shaft fastening portion 11. With rotation of the crankshaft, the flexible flywheel 10 rotates around the center point thereof, with a rotational moment acting on the elastic spoke portion 16. Due to the side edge-side boundary ends 44, 45 on which the stress is concentrated being provided on the same circle, even if the elastic spoke portion 16 is broken, an arc-like crack and an arc-like rupture are more likely to be generated between the side edge-side boundary ends 44, 45 along the rotation moment, whereby control of the breakage mode is facilitated. If the side edge-side boundary ends 44, 45 are not on the same circle and provided in positions at different distances from the center, a crack and a rupture extend in undesired directions. When a crack and a rupture extend in undesired directions, prediction of the breakage mode becomes difficult, and unpredictable breakage may be caused leading to greater likelihood of scattering of fragments. Such a risk can thus be alleviated.

(4) On the both side edges 31, 32 of the elastic spoke portion 16, the length of the virtual arc a connecting the side edge-side boundary ends 44, 45 of the boundaries 42, 43 between the weight portion 14 and the elastic spoke portion 16 is the shortest compared to other virtual concentric arcs connecting the both side edges 31, 32 in the circumferential direction of the elastic spoke portion 16. Due to the length being short, even if the elastic spoke portion 16 is broken, a risk of generation of a crack and a rupture in undesired directions such as a direction out of the arc is further reduced. As a result, the risk of unpredictable breakage leading to greater likelihood of scattering of fragments can be further reduced.

(5) The side edge-side boundary ends 44, 45 on which the stress generated by vibration of the elastic spoke portion 16 is concentrated are the ends of the boundaries 42, 43 between the elastic spoke portion 16 and the weight portions 14, which have differences in thickness. Due to the side edge-side boundary ends 44, 45 being provided by leveraging the difference in thickness between the elastic spoke portion 16 and the weight portion 14, the portions on which the stress is concentrated can be easily formed. In addition, due to the side edge-side boundary ends 44, 45 being small regions, which is nearly a point, concentration of the stress generated by vibration of the elastic spoke portion 16 is facilitated, and control of the breakage mode is also facilitated.

(6) The weight portion 14 is provided on the opposite side of the elastic spoke portion 16 in radial direction across the shaft fastening portion 11. When the crankshaft vibrates, the weight portions 14 are shaken by the vibration. Therefore, the vibration of the crankshaft can be absorbed by the shaking of the weight portions 14. Since the vibration of the crankshaft is absorbed by both the elastic spoke portions 16 and the weight portions 14, the vibration can be attenuated further.

In this case, the weight portions 14 are also integrally formed by casting together with the shaft fastening portion 11, the inertia ring 12 and the elastic disc 13. Therefore, presence of the weight portions 14 neither causes an increase in the number of components nor requires an additional fastening work. Thus, it is possible to enhance the vibration attenuation effect, while reducing production cost, without increasing the number of components or the number of working steps.

In addition, in the present embodiment, each weight portion 14 is provided on an extension line of the virtual line L1, L2, or L3 located on the widthwise center of a corresponding one of the elastic spoke portions 16. Therefore, the shaft fastening portion 11 is located between one elastic spoke portion 16 and one weight portion 14 when viewed along each of the virtual lines L1 to L3. Absorption and restriction of vibration are performed on both sides of the crankshaft, whereby the effect of attenuating the vibration of the crankshaft can be enhanced.

Note that the present disclosure is not limited to the flexible flywheel 10 according to the above-described embodiment, and, for example, the following configurations may be employed.

(a) In the above-described embodiment, the stress concentration portion is exemplified by the side edge-side boundary ends 44, 45 of the boundaries 42, 43 between the weight portion 14 and the elastic spoke portion 16, provided on the both side edges 31, 32 of the elastic spoke portion 16. Additionally, flexible flywheels 51, 52 provided with the stress concentration portions of the following two other modes may also be employed. Note that the following two other modes may also be employed as the stress concentration portion alternative to the side edge-side boundary ends 44, 45.

Figure 5:
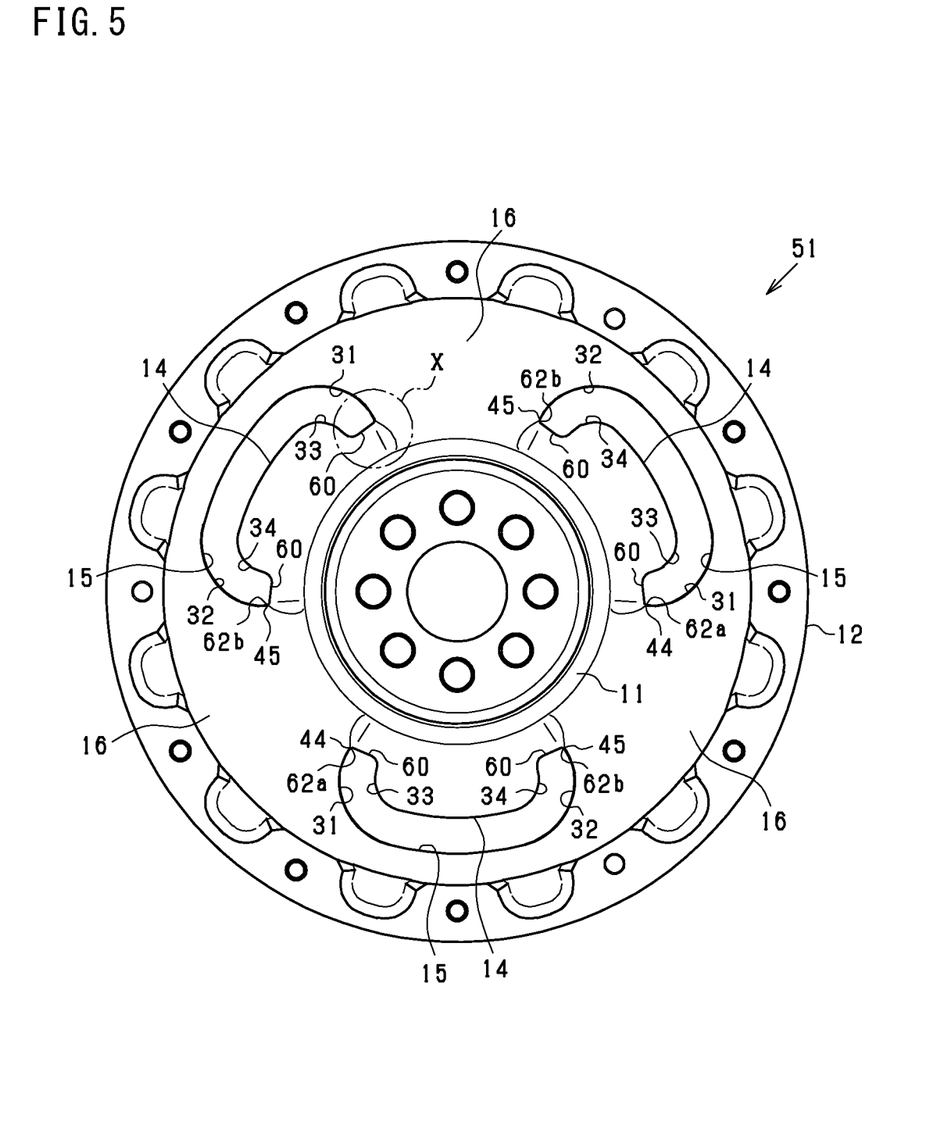
FIG. 5 is a front view showing another example of the flexible flywheel.
Figure 6:
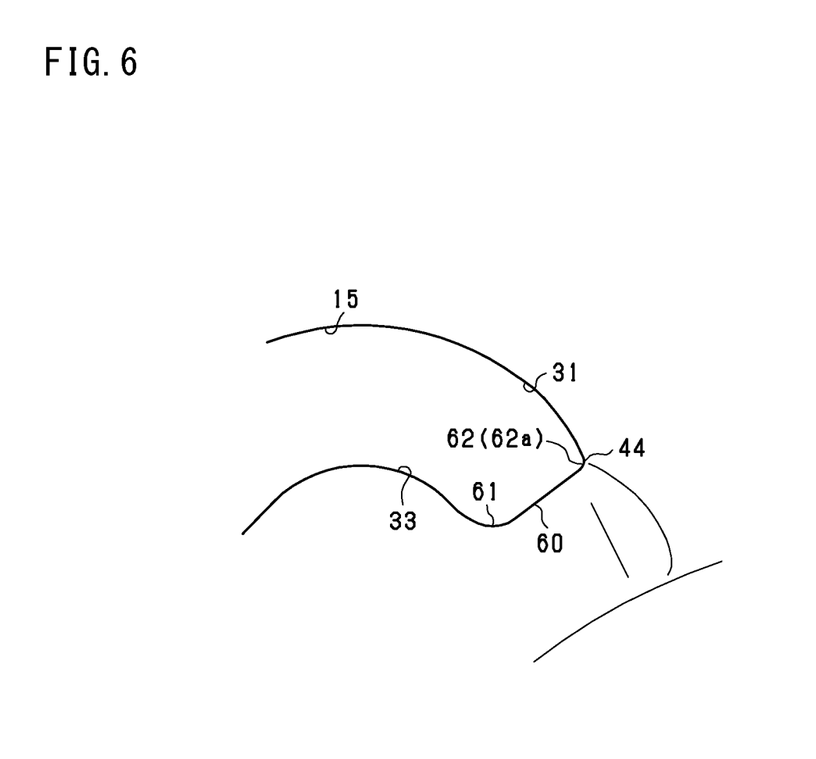
FIG. 6 is an enlarged view of the portion X of FIG. 5.

In the flexible flywheel 51 according to the first other mode, as shown in FIG. 5, among the both side edges 31, 32 of the elastic spoke portion 16 and the both side edges 33, 34 of the weight portions 14, adjacent ones are connected by a connection portion 60. Each connection portion 60 is divided into a first arc-like portion 61 and a second arc-like portion 62, as one of which is shown in FIG. 6 which is an enlarged view of the portion X of FIG. 5. The both arc-like portions 61, 62 are arranged side-by-side along the circumferential direction, and the second arc-like portion 62 is provided on the elastic spoke portion 16 side. The curvature radius of the second arc-like portion 62 is smaller than that of the first arc-like portion 61. Therefore, the second arc-like portion 62 has a steeper curve than the first arc-like portion 61, and is in a slightly pointed shape. The second arc-like portions 62a, 62b are provided at the centermost ends of the both side edges 31, 32 of the elastic spoke portion 16 where the side edge-side boundary ends 44, 45 are provided.

The stress generated upon deflection of the elastic spoke portion 16 due to vibration of the crankshaft is concentrated on the second arc-like portions 62a, 62b, in addition to the side edge-side boundary ends 44, 45. Consequently, in a case in which the elastic spoke portion 16 cannot resist the vibration and is broken, the side edge-side boundary ends 44, 45 and the apex parts of the second arc-like portions 62a, 62b on the both side edges 31, 32 serve as points of origin of the breakage, and a crack runs between the side edge-side boundary ends 44, 45 and between the second arc-like portions 62a, 62b, leading to a rupture. Therefore, in this other mode, the second arc-like portion 62, more specifically the apex part of the second arc-like portion 62, also corresponds to the stress concentration portion.

Figure 7:
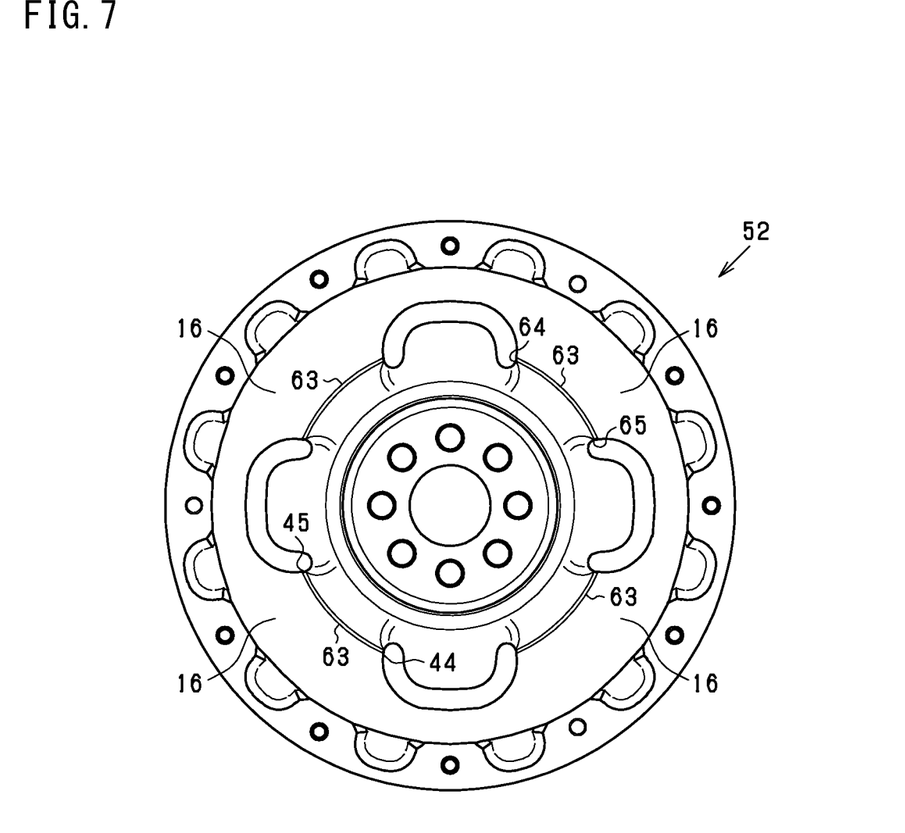
FIG. 7 is a front view showing another example of the flexible flywheel.

In the flexible flywheel 52 according to the second other mode, as shown in FIG. 7, a groove portion 63 is provided between the both side edges 31, 32 of the elastic spoke portion 16. The groove portion 63 is provided on the upper face of the elastic spoke portion 16, along the virtual arc a connecting the side edge-side boundary ends 44, 45, and is convex with respect to the upper face. The groove portion 63 is open outward at each of the side edge-side boundary ends 44, 45 at both ends thereof.

The stress generated upon deflection of the elastic spoke portion 16 due to vibration of the crankshaft is concentrated on open end portions 64, 65 on the both ends of the groove portion 63, in addition to the side edge-side boundary ends 44, 45. Consequently, in a case in which the elastic spoke portion 16 cannot resist the vibration and is broken, the side edge-side boundary ends 44, 45 and groove bottom portions of the open-end portions 64, 65 serve as points of origin of the breakage, and a crack runs between the side edge-side boundary ends 44, 45 along the groove portion 63, leading to a rupture. Therefore, in this second other mode, the open-end portions 64, 65 of the groove portion 63, more specifically the groove bottom portions with reduced thickness, also correspond to the stress concentration portion.

In each of the above-described other modes, the second arc-like portion 62 or the open end portions 64, 65 of the groove portion 63 also produce the same effect as that produced by the side edge-side boundary ends 44, 45. Furthermore, in the first other mode, due to the second arc-like portion 62 having the smaller curvature radius, among the two arc-like portions 61, 62 having different curvature radii, serving as the stress concentration portion, a degree of stress concentration is lowered compared with the case of an acute angle corner portion serving as the stress concentration portion, whereby occurrence of undue stress concentration can be suppressed. In addition, formation of the stress concentration portion is possible even in the case in which the weight portion 14 and the elastic spoke portion 16 are configured to have substantially the same thickness with no difference in thickness, with neither the boundaries 42, 43 nor the side edge-side boundary ends 44, 45 being formed. In the second other mode, if the elastic spoke portion 16 is broken, an arc-like crack and an arc-like rupture are more likely to be generated along the groove portion 63, whereby control of the breakage mode is facilitated.

(b) In the above-described embodiment, the side edge-side boundary ends 44, 45 provided on the both side edges 31, 32 of the elastic spoke portion 16 are provided on the same circle around the center point of the shaft fastening portion 11. Alternatively, respective distances of the side edge-side boundary ends 44, 45 from the center point may be configured to be different. Even when the side edge-side boundary ends 44, 45 are provided on the same circle, the side edge-side boundary ends 44, 45 may be provided on an arc of a larger circle. The same applies to the second arc-like portion 62, and the open-end portions 64, 65 of the groove portion 63 in the above-described two other modes.

(c) In the above-described embodiment, the elastic disc 13 is provided with three punched portions 15. Alternatively, the number of the punched portions 15 may be four as with the flexible flywheel 52 shown in FIG. 7. The number of the punched portions 15 being provided is arbitrary.

(d) In the above-described embodiment, the weight portions 14 are provided on the extension lines (on the extension lines of the virtual lines L1 to L3) located on the widthwise centers of the elastic spoke portions 16. Alternatively, as in the case of the flexible flywheel 52 shown in FIG. 7, a structure in which the weight portions 14 are provided at positions deviated from the extension lines located on the widthwise centers of the elastic spoke portions 16 may be employed.

In the case where the weight portions 14 are provided at positions deviated from the extension lines located on the widthwise centers, it is preferred that, as shown in FIG. 7, the weight portions 14 are provided on opposite sides of each elastic spoke portion 16 in the circumferential direction, and the weight portions 14 on the opposite sides are line-symmetrical with respect to an virtual line passing through the widthwise center of the elastic spoke portion 16 and have the same shape. By virtue of this structure, as in the case of the above-described embodiment, the vibration of the crankshaft can be equally absorbed on the left and right sides of the elastic spoke portion 16, whereby the vibration can be attenuated in a well-balanced manner.

(e) In the above-described embodiment, the punched portion 15 is formed in a C-shape, and each punched portion 15 is provided with one weight portion 14. Alternatively, a configuration may be employed in which one punched portion 15 forms a plurality of weight portions 14, for example the punched portion 15 is formed in an E-shape with two weight portions 14 being provided. Yet alternatively, a configuration may be employed in which each punched portion 15 is provided with a different number of weight portions 14. In the case in which one punched portion 15 forms a plurality of weight portions 14, it is preferred that the plurality of weight portions 14 are arranged to be line symmetric with respect to an extended line of a virtual line on which the elastic spoke portion 16 extends.

(f) In the above-described embodiment, the punched portion 15 is formed in a C-shape. The shape of the C-shape is arbitrary and not limited to the illustrated shape, and may be, for example, a C-shape with C-opening edge portions 71, 72 being bent inward to form acute angles as with the flexible flywheel 53 shown in FIG. 8. In the other mode shown in FIG. 8, an outer edge of the punched portion 15 and an inner edge of the inertia ring 12 are connected to substantially correspond to each other. Such a configuration may be employed instead of the configuration in which the punched portion 15 is provided in a position slightly away from the inner edge of the inertia ring 12, as with the punched portion 15 in the above-described embodiment.

(g) In the above-described embodiment, the shaft fastening portion 11, the inertia ring 12, the elastic disc 13, and the weight portion 14 are integrally formed by casting. Alternatively, a configuration may be employed in which these are separate components, the inertia ring 12 is fastened by a bolt or the like to the elastic disc 13 integrated with the weight portion 14, and, when the elastic disc 13 is attached to the crankshaft, the shaft fastening portion 11 (center plate) is integrated thereto. Yet alternatively, the present invention may be a flexible flywheel in which the shaft fastening portion 11, the inertia ring 12, the elastic disc 13, and the weight portion 14 are integrally formed by forging instead of casting. These configurations can also produce the same effect as that of the above-described embodiment.

(h) In the above-described embodiment, the weight portion 14 is formed to be thicker than the elastic disc 13. Alternatively, the thickness of the weight portion 14 and the thickness of the elastic disc 13 (elastic spoke portion 16) may be the same. In this case, due to absence of difference in thickness, the stress concentration portion cannot be provided by way of the side edge-side boundary ends 44, 45 as in the above-described embodiment. Even with the flexible flywheel in which the weight portion 14 and the elastic spoke portion 16 are configured to have substantially the same thickness, the same effect as that of the side edge-side boundary ends 44, 45 can be produced by employing the above-described two other modes in which the second arc-like portion 62 and the groove portion 63 are provided as the stress concentration portion. In addition, in a case in which the weight portion 14 and the elastic disc 13 have substantially the same thickness and the elastic disc is press-molded, a configuration may be employed in which the arc-like sloped portion 41 on both sides of the weight portion 14 in the circumferential direction is also formed upon press molding of the elastic disc 13, and a boundary similar to the boundaries 42, 43 in the above-described embodiment is formed at a boundary between the upper face of the arc-like sloped portion 41 and the upper face of the elastic spoke portion 16.

Figure 8:
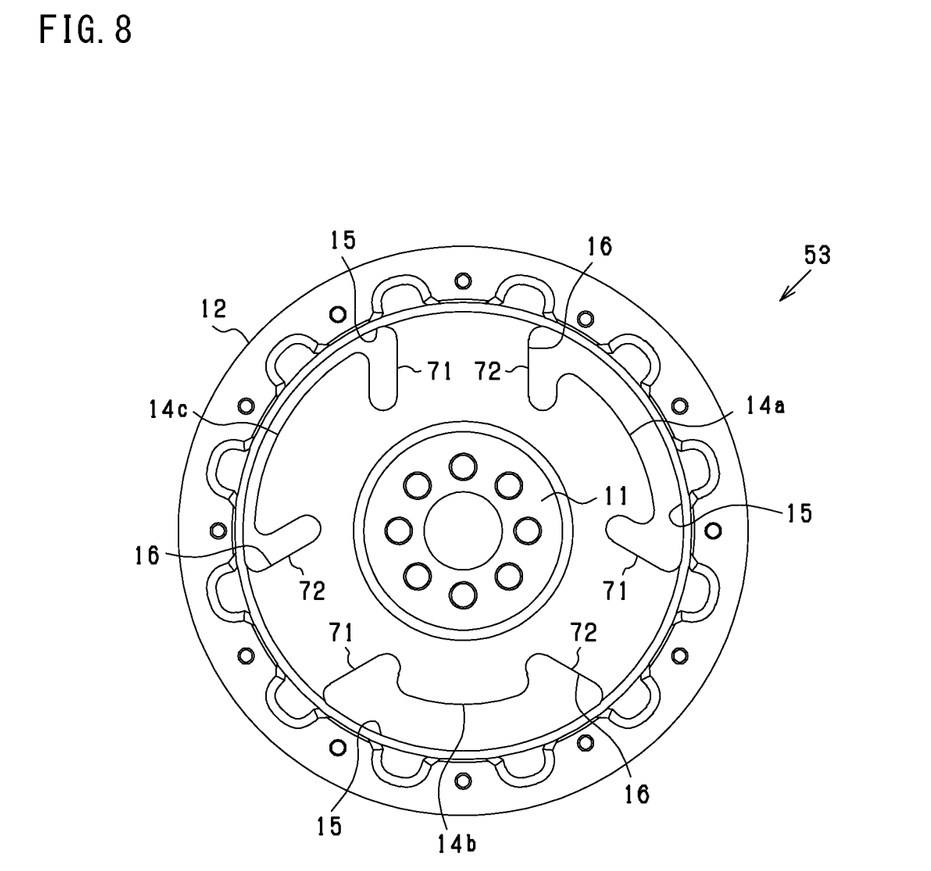
FIG. 8 is a front view showing another example of the flexible flywheel.

(i) In the above-described embodiment, the three weight portions 14 are the same in shape, size, and weight. Alternatively, weight portions 14a, 14b, 14c different in shape, size, and weight may be provided as shown in FIG. 8. Through adjustment of weight and the like of the weight portion 14, the natural frequency (resonant frequency) of the flexible flywheel 10 can be adjusted so as to obtain the optimal effect of attenuating vibration for the vibration characteristics of the crankshaft to which the flexible flywheel 10 is attached.

(j) In the above-described embodiment, the arc-like sloped portion 41 which is sloped to form an arc is provided on both sides of the weight portion 14 in the circumferential direction. Alternatively, a configuration may be employed in which flat sloped face is provided on both sides of the weight portion 14 in the circumferential direction, or the upper face of the weight portion 14 and the upper face of the elastic spoke portion 16 are connected by a stepped portion which is perpendicular.

(k) In the above-described embodiment, the weight portions 14 are connected to the shaft fastening portion 11, not connected to the inertia ring 12, and provided to be spaced apart from the inertia ring 12. To the contrary, the weight portions 14 may be connected to the inertia ring 12, not connected to the shaft fastening portion 11, and provided to be spaced apart from the shaft fastening portion 11. In this case, the C-shaped punched portion 15 is provided on the elastic disc 13 such that the opening of the C-shape is directed to the inertia ring 12.

(l) In the above-describe embodiment, the internal combustion engine (engine) of a vehicle is assumed to be a rotating machine. The application of the present disclosure is not limited thereto. The present disclosure may be applied to, for example, a flywheel used in a press machine so long as the flywheel is used for the purpose of, for example, stabilizing rotation by utilizing moment of inertia or storing rotation energy.

The present disclosure has been described in conformity with examples but is not limited to the examples and the structures therein. The present disclosure encompasses a variety of variation examples and variations in the scope of equivalents of the present disclosure. In addition, a variety of combinations and forms and even other combinations and forms to which only one element or two or more elements are added fall within the scope and ideological range of the present disclosure.

REFERENCE SIGNS LIST

10 . . . flexible flywheel, 11 . . . shaft fastening portion, 12 . . . inertia ring, 14 . . . weight portion, 16 . . . elastic spoke portion, 31, 32 . . . side edge, 42, 43 . . . boundary, 44, 45 . . . side edge-side boundary end (stress concentration portion).

The invention claimed is:

1. A flexible flywheel comprising:
a shaft fastening portion having an annular shape and being configured to be fixed to an end portion of a shaft of a rotating machine;
an inertia ring having an annular shape and having an inner diameter greater than an outer diameter of the shaft fastening portion;
a first elastic spoke portion extending in a radial direction of the shaft fastening portion, including a first end edge joined to the shaft fastening portion and a second end edge joined to the inertia ring, and including a first side edge and a second side edge spaced apart from each other in a circumferential direction of the shaft fastening portion;
a second elastic spoke portion being spaced apart from the first elastic spoke portion in the circumferential direction, extending in the radial direction, including a third end edge joined to the shaft fastening portion and a fourth end edge joined to the inertial ring, and including a third side edge and a fourth side edge spaced apart from each other in the circumferential direction;
at least one weight portion being between the first elastic spoke portion and the second elastic spoke portion in the circumferential direction, protruding from the shaft fastening portion toward the inertia ring, including a free end spaced apart from the inertia ring and a flat upper face, and being thicker than the first elastic spoke portion and the second elastic spoke portion;
a first sloped portion sloping from the flat upper surface down to the first elastic spoke portion; and
a second sloped portion sloping from the flat upper surface down to the second elastic spoke portion.

2. The flexible flywheel according to claim 1, wherein the at least one weight portion is longer in the circumferential direction than in the radial direction.

3. The flexible flywheel according to claim 1, wherein
the first sloped portion slopes down to a first end section of the first elastic spoke portion including the first end edge, and
the second sloped portion slopes down to a second end section of the second elastic spoke portion including the third end edge.

4. The flexible flywheel according to claim 3, further comprising at least one void defined by an outer edge of the at least one weight portion, an outer edge of the first sloped portion, an outer edge of the second sloped portion, the second side edge of the first elastic spoke portion, the third side edge of the second elastic spoke portion, and a curved edge that connects the second side edge of the first elastic spoke portion with the third side edge of the second elastic spoke portion.

5. The flexible flywheel according to claim 4, further comprising a third elastic spoke portion, a third sloped portion, and a fourth sloped portion, wherein
the third elastic spoke portion being spaced apart from the second elastic spoke portion in the circumferential direction, extending in the radial direction, including a fifth end edge joined to the shaft fastening portion and a sixth end edge joined to the inertia ring, and including a fifth side edge and a sixth side edge spaced apart from each other in the circumferential direction,
the at least one weight portion includes a first weight portion and a second weight portion,
the first weight portion is between the first elastic spoke portion and the second elastic spoke portion in the circumferential direction, protruding from the shaft fastening portion toward the inertial ring, including a free end spaced apart from the inertial ring and a flat surface, and being thicker than the first elastic portion and the second elastic portion
the second weight portion is between the second elastic portion and the third elastic spoke portion in the circumferential direction, protruding from the shaft fastening portion toward the inertial ring, including a free end spaced apart from the inertial ring and a flat surface, and being thicker than the second elastic portion and the third elastic portion,
the third sloped portion sloping form the flat upper surface of the second weight portion down to the second end section of the second elastic spoke portion including the third end edge, and
the fourth sloped portion sloping from the flat upper surface of the second weight portion down to a third end section of the third elastic spoke portion including the fifth end edge.

6. The flexible flywheel according to claim 5, wherein the second weight portion is longer in the circumferential direction than in the radial direction.

7. The flexible flywheel according to claim 4, wherein the first sloped portion, the second sloped portion, the third sloped portion, and the fourth sloped portion are disposed along a circumference of the shaft fastening portion.

8. The flexible flywheel according to claim 7, wherein the second sloped portion and the third sloped portion slope down toward each other.

9. The flexible flywheel according to claim 5, wherein
the at least one void includes a first void and a second void,
the first void is defined by the outer edge of the at least one weight portion, the outer edge of the first sloped portion, the outer edge of the second sloped portion, the second side edge of the first elastic spoke portion, the third side edge of the second elastic spoke portion, and the curved edge that connects the second side edge of the first elastic spoke portion with the third side edge of the second elastic spoke portion, and
the second void is defined by an outer edge of the second weight portion, an outer edge of the third sloped portion, an outer edge of the fourth sloped portion, the fourth side edge of the second elastic spoke portion, the fifth side edge of the third elastic spoke portion, and a curved edge connecting the fourth side edge of the second elastic spoke portion with the fifth side edge of the third elastic spoke portion.

10. The flexible flywheel according to claim 9, wherein
the second side edge of the first elastic spoke portion joins a border between the first elastic spoke portion and the first weight portion,
the third side edge of the second elastic spoke portion joins a border between the first weight portion and the second elastic spoke portion,
the fourth side edge of the second elastic spoke portion joins a border between the second elastic spoke portion and the second weight portion, and
the fifth side edge of the third elastic spoke portion joins a border between the second weight portion and the third elastic spoke portion.

11. The flexible flywheel according to claim 4, wherein
the at least one void includes a first corner and a second corner,
the first corner is defined by the outer edge of the at least one weight portion and the outer edge of the second sloped portion,
the second corner is defined by the outer edge of the second sloped portion and the second side edge of the first elastic spoke portion, and
the second corner has a steeper curve than the first corner.

* * * * *